United States Patent
Takaichi et al.

(10) Patent No.: US 10,583,579 B2
(45) Date of Patent: Mar. 10, 2020

(54) APPARATUS AND METHOD FOR MANUFACTURING FIELD-POLE MAGNET

(71) Applicant: NISSAN MOTOR CO., LTD., Yokohama-shi, Kanagawa (JP)

(72) Inventors: Kazuhiro Takaichi, Yokohama (JP); Kimio Nishimura, Yokohama (JP); Hiroharu Takeuchi, Yokohama (JP); Kunitomo Ishiguro, Odawara (JP); Kiyoshi Hasegawa, Yokohama (JP); Yasuhisa Koike, Fujisawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 62 days.

(21) Appl. No.: 14/347,040

(22) PCT Filed: Sep. 20, 2012

(86) PCT No.: PCT/JP2012/073977
§ 371 (c)(1),
(2) Date: Mar. 25, 2014

(87) PCT Pub. No.: WO2013/047298
PCT Pub. Date: Apr. 4, 2013

(65) Prior Publication Data
US 2014/0231483 A1    Aug. 21, 2014

(30) Foreign Application Priority Data

Sep. 26, 2011  (JP) ................................ 2011-209235

(51) Int. Cl.
| | |
|---|---|
| *B26F 3/00* | (2006.01) |
| *H02K 15/03* | (2006.01) |
| *H01F 41/02* | (2006.01) |

(52) U.S. Cl.
CPC ................ *B26F 3/00* (2013.01); *B26F 3/002* (2013.01); *H01F 41/0253* (2013.01);
(Continued)

(58) Field of Classification Search
CPC ........ B26F 3/00; B26F 3/002; H01F 41/0253; Y10T 225/10; Y10T 225/386
(Continued)

(56) References Cited

U.S. PATENT DOCUMENTS 3,882,807 A *  5/1975  Montgomery .................. 29/827
4,893,536 A *  1/1990  Kinoshita .............. B21D 28/16
                                                        83/451

(Continued)

FOREIGN PATENT DOCUMENTS

| CN | 101889318 A | 11/2010 |
|---|---|---|
| JP | 2000-6130 A | 1/2000 |

(Continued)

OTHER PUBLICATIONS

Korean Office Action, dated Jan. 26, 2015, 5 pages.

*Primary Examiner* — Andrea L Wellington
*Assistant Examiner* — Fernando A Ayala
(74) *Attorney, Agent, or Firm* — Foley & Lardner LLP

(57) ABSTRACT

A field-pole magnet manufacturing apparatus fractures a magnet fixed on a die serving as a lower tool by causing a punch of an upper tool to press the magnet while in contact with the magnet. At least one projection is formed in the punch of the upper tool symmetrically with respect to the central position of the magnet in the width direction of the magnet.

8 Claims, 10 Drawing Sheets

(52) U.S. Cl.
CPC ............ *H02K 15/03* (2013.01); *Y10T 225/10* (2015.04); *Y10T 225/386* (2015.04)

(58) Field of Classification Search
USPC .............................. 225/104, 105, 96.5, 1, 94
See application file for complete search history.

(56) References Cited

U.S. PATENT DOCUMENTS

| | | | |
|---|---|---|---|
| 4,948,025 A * | 8/1990 | Lisec ............................ | 225/104 |
| 5,443,195 A * | 8/1995 | Sinn ............................. | 225/104 |
| 6,925,922 B2 * | 8/2005 | Manabe et al. ................ | 83/694 |
| 8,497,613 B2 * | 7/2013 | Nakamura et al. ...... | 310/156.38 |
| 8,627,753 B2 * | 1/2014 | Laib et al. ..................... | 83/553 |
| 2006/0154449 A1 | 7/2006 | Kobayashi | |
| 2007/0039990 A1 * | 2/2007 | Kemmerer ........... | B28D 5/0011 |
| | | | 225/2 |
| 2010/0244608 A1 | 9/2010 | Nakamura et al. | |
| 2012/0104711 A1 * | 5/2012 | Alexander ................ | 280/47.34 |
| 2013/0057374 A1 * | 3/2013 | Adachi ................ | H01F 7/0221 |
| | | | 335/306 |

FOREIGN PATENT DOCUMENTS

| | | |
|---|---|---|
| JP | 2002-018797 A | 1/2002 |
| JP | 2004-26539 A | 1/2004 |
| JP | 2009-142081 A | 6/2009 |
| JP | 2010-252515 A | 6/2010 |
| JP | 2010-159187 A | 7/2010 |
| KR | 10-2010-0072371 A | 6/2010 |

* cited by examiner

APPARATUS AND METHOD FOR MANUFACTURING FIELD-POLE MAGNET

TECHNICAL FIELD

The present invention relates to an apparatus and a method for manufacturing a field-pole magnet arranged in a rotor core of a permanent magnet-embedded rotary electric machine.

BACKGROUND ART

Field-pole magnets are arranged in a rotor core of a permanent magnet-embedded rotary electric machine. One conventionally-known example is a field-pole magnet formed by fracturing a magnet having a rectangular shape in a plan view (hereinafter simply referred to as a magnet) into a plurality of magnet pieces and bonding the plurality of magnet pieces with one another. By thus forming a field-pole magnet from a plurality of magnet pieces, the volume of each magnet piece is reduced, and overcurrent caused by a fluctuation in an active magnetic field is reduced. In this way, heating of the field-pole magnet associated with overcurrent is suppressed, and irreversible thermal demagnetization is prevented (see JP 2009-142081A).

According to JP 2009-142081A, cutouts are formed in advance on a plurality of intended fracture surfaces of a magnet, and the magnet is arranged between a punch with a convex multi-angular surface and a die with a concave multi-angular surface. By pushing the punch against the die, the magnet is fractured along the intended fracture surfaces. As a result, a plurality of magnet pieces are generated.

SUMMARY OF INVENTION

Incidentally, fracture of a magnet into magnet pieces may result in abnormal fracture in which fracture surfaces of the magnet pieces do not match the intended fracture surfaces or become two-pronged. Abnormal fracture could possibly lead to deterioration in the accuracy of fracture surfaces. Abnormal fracture is assumed to occur due to partial hitting whereby a punch of an upper tool comes into contact only with one side of the magnet in the width direction (the direction along the fracture surfaces) at the time of fracture.

This partial hitting whereby the punch of the upper tool comes into contact only with one side of the magnet in the width direction is caused by poor parallelism between upper and lower tools, poor parallelism of the raw material of the magnet itself, warpage of the raw material, poor flatness of the raw material (concavities and convexities on the front surface of the raw material), and the like.

The present invention has been made in view of the above problem, and aims to provide an apparatus and a method for manufacturing a field-pole magnet arranged in a rotor core of a rotary electric machine that are suitable for improving the accuracy of fracture surfaces.

A field-pole magnet manufacturing apparatus in one embodiment fractures a magnet fixed on a die serving as a lower tool by causing a punch of an upper tool to press the magnet while in contact with the magnet. At least one projection is formed in the punch of the upper tool symmetrically with respect to the central position of the magnet in the width direction of the magnet.

Embodiments and advantages of the present invention will be described below in detail with reference to the attached drawings.

DESCRIPTION OF EMBODIMENTS

First, a description is given of field-pole magnet according to the present invention as arranged in a rotor core of a rotary electric machine.

Figure 1:
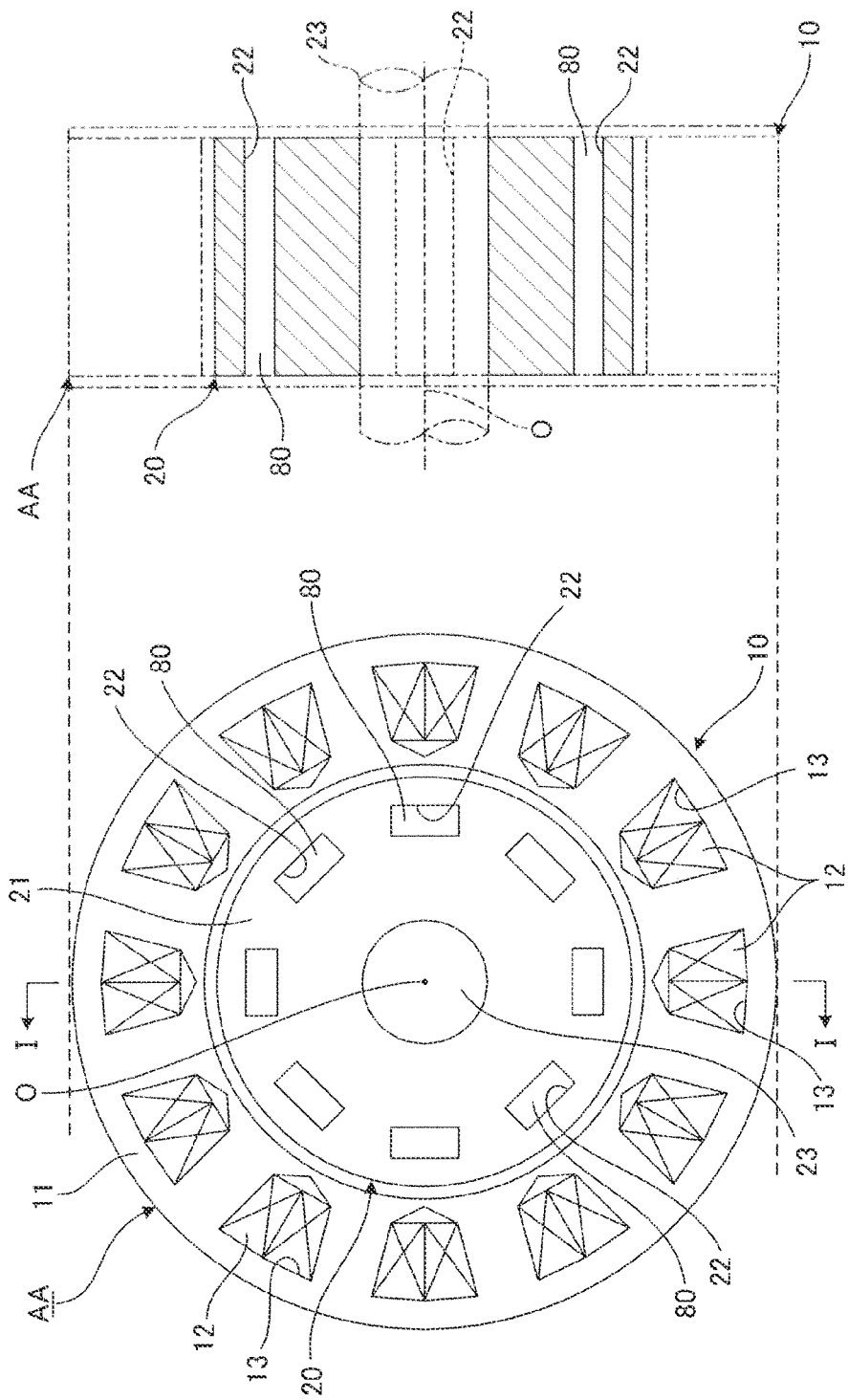
FIG. 1 is a schematic diagram showing configurations of major components of a permanent magnet type electric motor that utilizes magnets manufactured by a field-pole magnet manufacturing apparatus according to the present invention.

FIG. 1 is a schematic diagram showing configurations of major components of a permanent magnet type electric motor that utilizes magnets manufactured by a field-pole magnet manufacturing apparatus according to the present invention. More specifically, FIG. 1 shows a cross-sectional view and a side view of the permanent magnet type electric motor on the left side and the right side, respectively. In FIG. 1, a permanent magnet-embedded rotary electric machine AA (hereinafter simply referred to as "rotary electric machine") includes a stator 10 having a shape of a circular ring and a rotor 20 having a shape of a circular cylinder. The stator 10 constitutes a part of a casing, which is not shown in the drawings. The rotor 20 is arranged coaxially with this stator 10.

The stator 10 includes a stator core 11 and a plurality of coils 12. The plurality of coils 12 are housed in slots 13 that are formed in the stator core 11 at an equal angular interval on the same circumference around an axial center O, which is the origin.

The rotor 20 includes a rotor core 21, a rotary shaft 23 that rotates integrally with the rotor core 21, and a plurality of field-pole magnets 80. The plurality of field-pole magnets 80 are housed in slots 22 that are formed at an equal angular interval on the same circumference around the axial center O, which is the origin.

Figure 2:
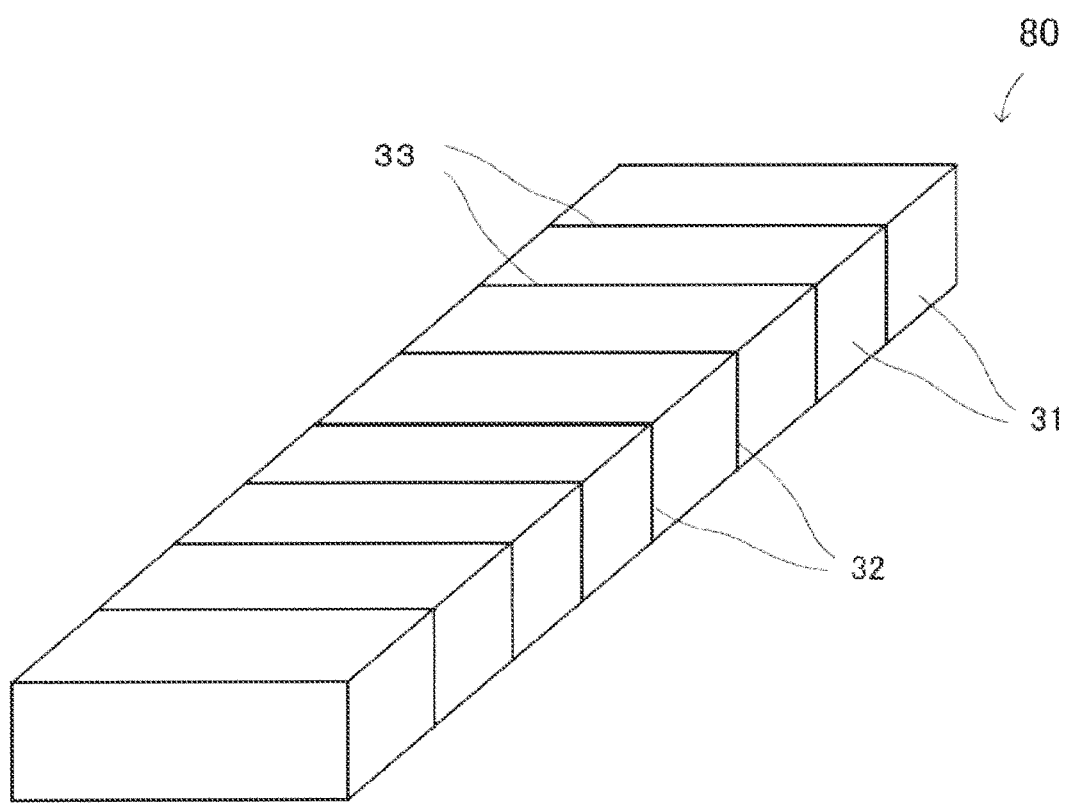
FIG. 2 shows a configuration of a magnet.

As shown in FIG. 2, each of the field-pole magnets 80 housed in the slots 22 of the rotor 20 is configured as an aggregate of a plurality of aligned magnet pieces 31. The plurality of magnet pieces 31 are obtained by fracturing a magnet 30, which is rectangular in a plan view along the thickness direction, into smaller pieces along the width direction. The fracture surfaces of the magnet pieces 31 are bonded with one another using resin 32. The resin 32 used herein has, for example, a heat resistance up to approximately 200° C., and provides electric insulation between adjacent magnet pieces 31. Therefore, overcurrent caused by a fluctuation in an active magnetic field is reduced by keeping the overcurrent within each magnet piece 31. As a result, heating of the field-pole magnets 80 associated with the overcurrent is suppressed, and irreversible thermal demagnetization is prevented.

In order to fracture the magnet 30 into the plurality of magnet pieces 31, it is beneficial to form cutout grooves 33 in advance at sites of the magnet 30 to be fractured. Although the following describes the magnet 30 on which the cutout grooves 33 are formed, these cutout grooves 33 are not indispensable. For example, if the magnet 30 can be fractured without forming the cutout grooves 33, the cutout grooves 33 may not be formed on the magnet 30. The greater the depth of the formed cutout grooves 33 from the front surface and the sharper the distal ends of the cutout grooves 33, the flatter the fracture surfaces of the fractured magnet pieces 31.

The cutout grooves 33 may be formed by way of a formation process for the magnet 30 via groove-forming projections provided in a die used to form the magnet 30; machining using a dicer, a slicer, and the like; laser beam emission; and wire-cut electrical discharge machining.

Incidentally, the magnet 30 may be provided with the front surface thereof inclined in the width direction, or one side thereof in the width direction protruding compared to the other side thereof, due to poor parallelism of the raw material of the magnet 30 itself, warpage of the raw material, poor flatness of the raw material (concavities and convexities on the front surface of the raw material), and the like. If a punch is pressed against such a magnet 30 so as to fracture the magnet 30, partial hitting may occur whereby the punch hits one side of the magnet 30 in the width direction (the distribution of stress applied by the punch to the magnet 30 is uneven between one side and the other side bordered by the center of the magnet 30 in the width direction). This may cause the occurrence of abnormal fracture in which fracture surfaces do not match the intended fracture surfaces or become two-pronged. Consequently, the accuracy of the fracture surfaces may deteriorate.

In view of the above, the present invention provides an apparatus and a method for manufacturing a field-pole magnet that are provided with a punch suitable for improving the partial hitting against the magnet 30.

Figure 3:
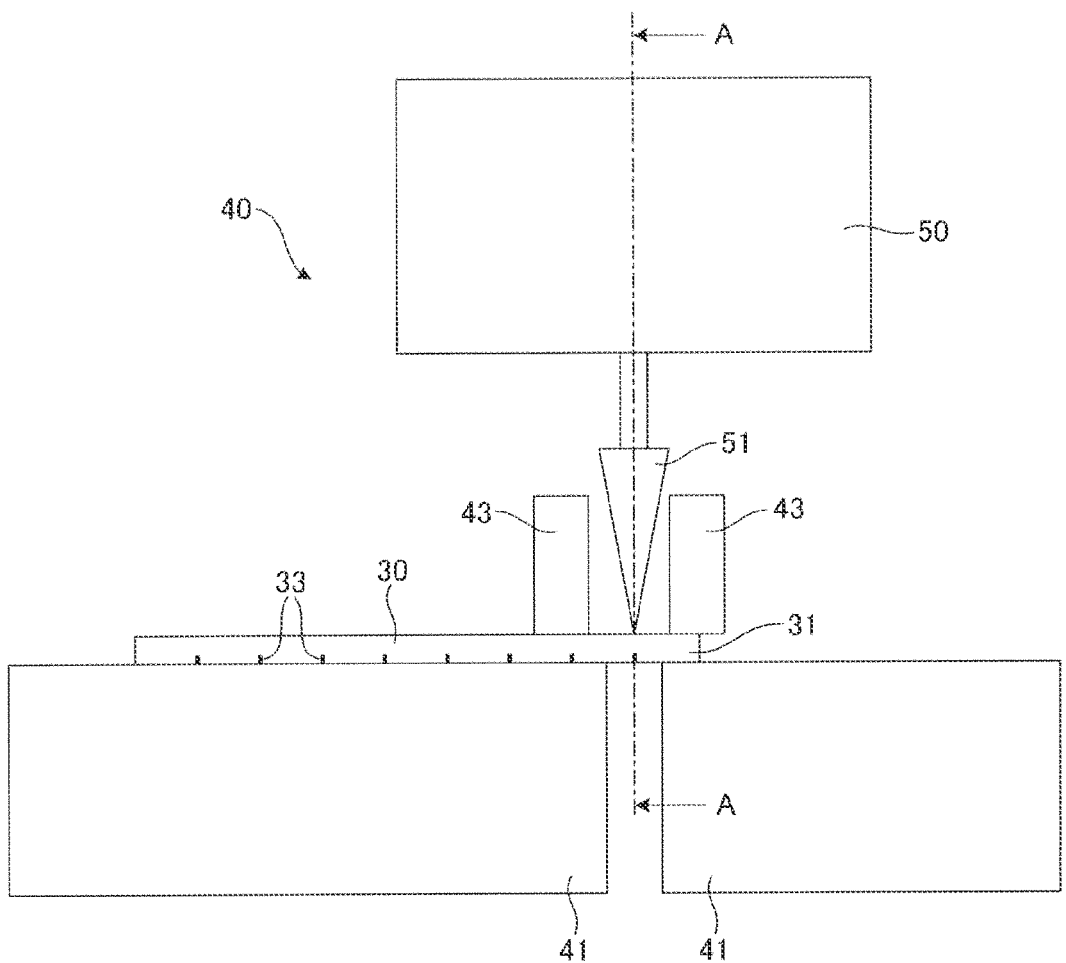
FIG. 3 is a schematic configuration diagram showing one example of a magnet fracture apparatus representing a field-pole magnet manufacturing apparatus according to a first embodiment of the present invention.
Figure 4:
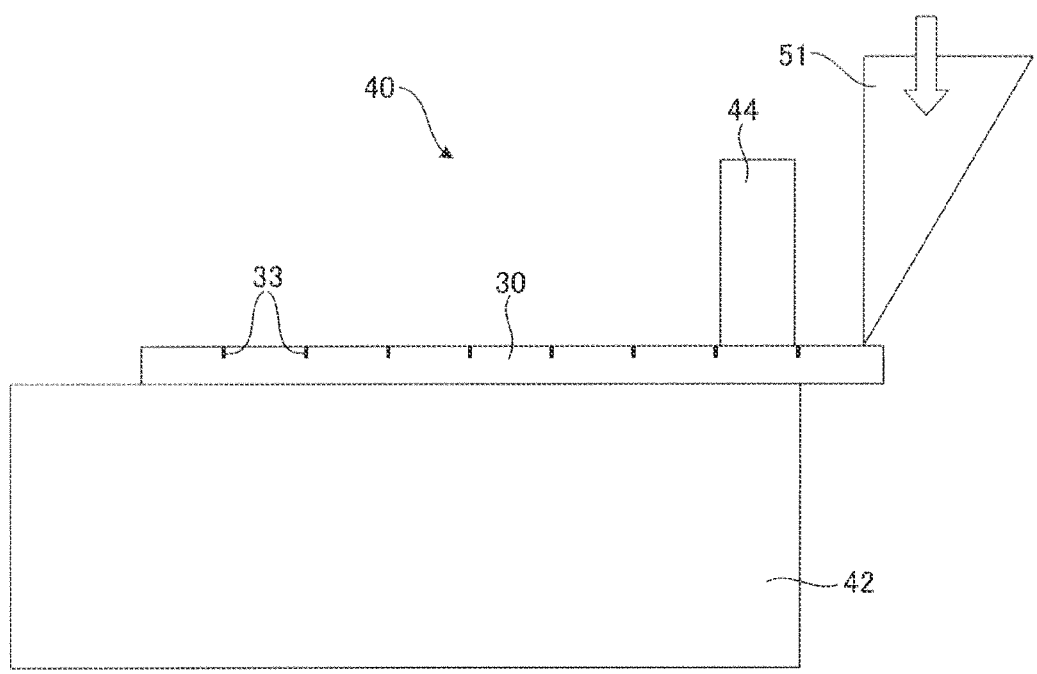
FIG. 4 is a schematic configuration diagram showing another example of a magnet fracture apparatus representing a field-pole magnet manufacturing apparatus according to the first embodiment of the present invention.

FIGS. 3 and 4 are schematic configuration diagrams showing magnet fracture apparatuses 40 each representing a field-pole magnet manufacturing apparatus according to an embodiment of the present invention. The following describes an overview of the magnet fracture apparatuses 40 shown in FIGS. 3 and 4, and configurations of punches that can be used in both of the magnet fracture apparatuses 40 shown in FIGS. 3 and 4, in stated order.

In the magnet fracture apparatus 40 shown in FIG. 3, the magnet 30 is fixed across a pair of dies 41, and the magnet 30 is fractured in the form of three-point bending by lowering a punch 51 from above toward a portion of the magnet 30 located between the pair of dies 43. This magnet fracture apparatus 40 includes the pair of dies 41, which serves as a lower tool, and magnet fixing jigs 43. The magnet 30 is placed across the pair of dies 41 and fixed by the magnet fixing jigs 43 at adjacent end portions of the pair of dies 41. The magnet fracture apparatus 40 also includes the punch 51 that is provided in an upper tool 50 to fracture the magnet 30 by pushing the portion of the magnet 30 located between the pair of dies 41.

The magnet fixing jigs 43 fix the magnet 30 by pressing the magnet 30 against edges of the pair of dies 41. More specifically, the magnet fixing jigs 43 press the magnet 30 by fastening bolts, by hydraulic pressure, or by air pressure. The punch 51 breaks the magnet 30 along cutout grooves 33 of the magnet 30 by pressing down the portion of the magnet 30 located between the pair of dies 41. The punch 51 is driven by a servo press, a mechanical press, a hydraulic press, and the like.

In the magnet fracture apparatus 40 configured in the above-described manner, the magnet 30 provided with the grooves 33 is placed across the upper surfaces of the pair of dies 41. Here, the magnet 30 is placed on the pair of dies 41 such that the positions thereof desired to be fractured, that is to say, the cutout grooves 33 provided in advance at the intended fracture surfaces, oppose the dies 41. The magnet 30 is fixed by the magnet fixing jigs 43 in the state where one of the cutout grooves 33 provided at the intended fracture surfaces is positioned at the center of the portion of the magnet 30 located between the pair of dies 41 using, for example, a servo mechanism. By lowering the punch 51, the magnet 30 is broken into pieces along the stated one of the cutout grooves 33. Thereafter, the fixture by the magnet fixing jigs 43 is released, and the magnet 30 is conveyed by the length of one magnet piece 31 (corresponding to the distance between adjacent cutout grooves 33). By repeating the above operation, the magnet 30 is fractured into a plurality of magnet pieces 31.

In the magnet fracture apparatus 40 shown in FIG. 4, the magnet 30 is fixed in the state where it protrudes from an end portion of a die 42, and the magnet 30 acting as a cantilever is fractured by lowering the punch 51 from above toward a protruding portion of the magnet 30.

This magnet fracture apparatus 40 includes the die 42, a magnet fixing jig 44, and the punch 51. The magnet 30 is placed on the die 42. The magnet fixing jig 44 fixes the magnet 30 at the end portion of the die 42. The punch 51 fractures the magnet 30 by pushing the portion of the magnet 30 protruding from the die 42.

The magnet fixing jig 44 fixes the magnet 30 by pressing the magnet 30 against the die 42. More specifically, the magnet fixing jig 44 presses the magnet 30 by fastening bolts or by hydraulic pressure. The punch 51 fractures the magnet 30 along the cutout grooves 33 of the magnet 30 by pressing down the portion of the magnet 30 protruding from the die 42. The punch 51 is driven by a servo press, a mechanical press, a hydraulic press, and the like, for example.

In the magnet dividing tool 40 configured in the above-described manner, the magnet 30 provided with the cutout grooves 33 is placed on the upper surface of the die 42. Here, the magnet 30 is placed on the die 42 such that the positions thereof desired to be fractured, that is to say, the cutout grooves 33 provided in advance at the intended fracture surfaces, face upward or the direction away from the die 42. The magnet 30 is fixed by the magnet fixing jig 44 in the state where the magnet 30 is positioned so as to protrude from the right end of the die 42 by the length corresponding to one magnet piece 31 (corresponding to the distance between adjacent cutout grooves 33) using, for example, a servo mechanism. By lowering the punch 51, the magnet 30 is fractured into pieces along one of the cutout grooves 33. By repeating the above operation, the magnet 30 is fractured into the plurality of magnet pieces 31.

The punch 51 according to the present embodiment, which is used in the above-described magnet fracture apparatuses 40 shown in FIGS. 3 and 4, has at least one projection 52 formed symmetrically with respect to the center of the magnet 30 in the width direction as shown in FIGS. 5 to 9.

Figure 5:
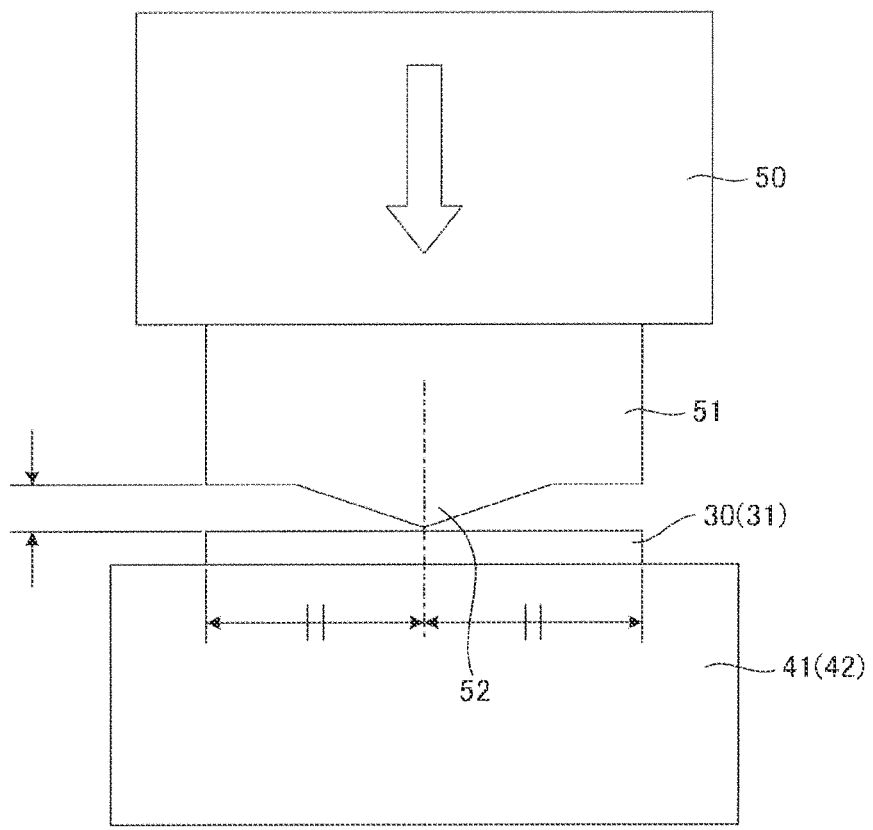
FIG. 5 illustrates a punch according to a first working example used in a magnet fracture apparatus.

A punch 51 according to a first working example shown in FIG. 5 has one projection 52 located at the center in the width direction of the magnet 30. It should be noted that the height of the projection 52 is exaggerated in the illustration of FIG. 5. In practice, the height of the projection 52 is set to be equal to or larger than the size tolerance set with respect to parallelism of the raw material of the magnet 30, warpage of the raw material, and flatness of the material (concavities and convexities on the front surface of the raw material). By thus setting the height of the projection 52 of the punch 51, the projection 52 can come into contact with the central position of the magnet 30 in the width direction, even in consideration of tolerances of parallelism of the raw material of the magnet 30, warpage of the raw material, and flatness of the material (concavities and convexities on the front surface of the raw material).

Figure 10A:
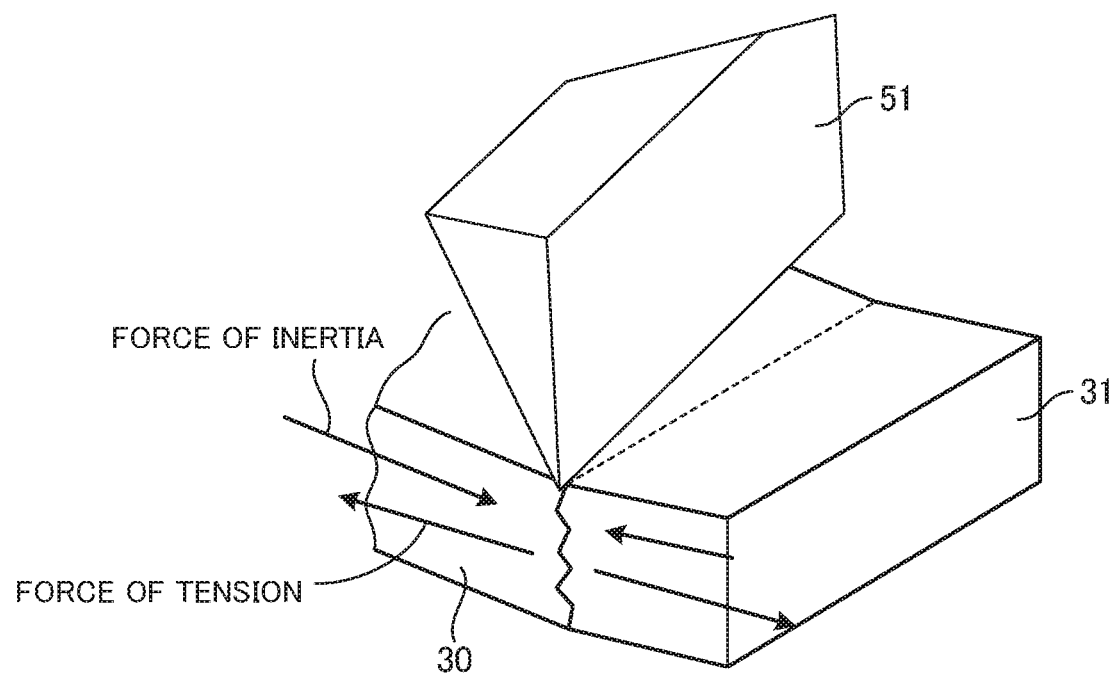
FIG. 10A illustrates actions of forces generated when a punch has partially hit a magnet.
Figure 10B:
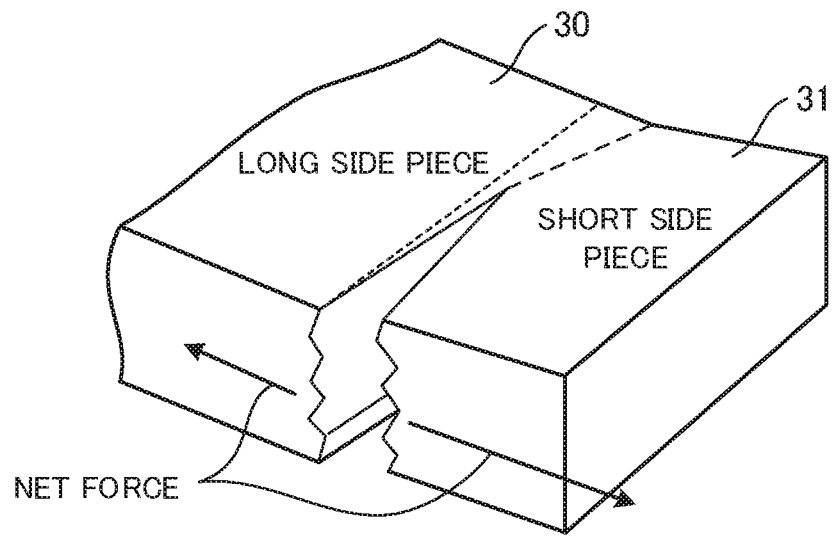
FIG. 10B shows an example of fracture of a magnet when a punch has partially hit the magnet.

Incidentally, as shown in FIGS. 10A and 10B, when partial hitting has occurred whereby the punch 51 comes into contact only with one side of the magnet 30 in the width direction (when the distribution of stress applied to the magnet 30 is uneven between one side and the other side bordered by the center of the magnet 30 in the width direction), a crack is formed only from one side of the magnet 30 in the width direction. As shown in FIG. 10A, forces of tension and inertia are applied to the magnet 30. The force of tension acts on one side of the magnet 30 in the width direction so as to break open the magnet 30 in the left-right direction. The force of inertia apparently acts in the directions cancelling out the force of tension due to the mass of the magnet 30. The force of inertia due to the mass of the magnet 30 acts differently on the left side and the right side of the intended fracture surfaces. More specifically, the force of inertia is large on a long side that has a large size in the longitudinal direction and has a large mass, and is small on a short side (magnet piece 31) that has a small size in the longitudinal direction and has a small mass.

For this reason, as shown in FIG. 10B, the net force obtained by adding the aforementioned forces of tension and inertia is not balanced between the long side and the short side, and broken surfaces warp toward the short side that is fractured off the magnet 30. In this case, abnormal fracture occurs in which fracture surfaces of the magnet 30 do not match the intended fracture surfaces or become two-pronged, resulting in deterioration of the accuracy of fracture surfaces.

On the other hand, according to the present working example, the projection 52 provided in the punch 51 can prevent the occurrence of partial hitting by reliably coming into contact with the central portion of the magnet 30 in the width direction at the time of fracturing the magnet 30. This allows cracks to be formed from the central position of the magnet 30 in the width direction during contact. The cracks formed in the central portion propagate toward both sides in the width direction of the magnet 30. When the cracks reach both side portions of the magnet 30, the magnet 30 is fractured along the intended fracture surfaces. Furthermore, as the origin of the formed cracks is the central portion of the magnet 30 in the width direction, the formed cracks reach the corresponding side portions substantially at the same time.

Moreover, the projection 52 provided in the punch 51 can reliably come into contact with the central portion of the magnet 30 in the width direction even under the presence of poor parallelism between upper and lower tools, poor parallelism of the raw material of the magnet 30 itself, warpage of the raw material, poor flatness of the material (concavities and convexities on the front surface of the raw material), and the like. This allows cracks to be formed from the central position of the magnet 30 in the width direction during contact. Hence, the cracks formed in the central portion propagate toward both sides in the width direction of the magnet 30. When the cracks reach both side portions of the magnet 30, the magnet 30 can be fractured along the intended fracture surfaces. As a result, the occurrence of abnormal fracture, in which fracture surfaces do not match the intended fracture surfaces or become two-pronged, can be prevented, and the accuracy of fracture surfaces can be improved. In addition, as increased accuracy of parallelism between upper and lower tools is not required, manufacture and management of the tools are easy.

Fractured magnet pieces 31 are bonded in order of fracture by applying an adhesive agent between fracture surfaces. As a result, the fractured magnet pieces 31 are re-integrated as a field-pole magnet 80. An epoxy-based thermosetting adhesive agent, a UV curing adhesive agent, a two-component room temperature curing adhesive agent, and the like may be used as the adhesive agent. Furthermore, in order to ensure clearance between magnet pieces 31, the adhesive agent contains spacer material such as glass beads, resin beads, and insulating cloths. Moreover, jigs are used when bonding the magnet pieces 31 by applying the adhesive agent. These jigs align the magnet pieces 31 by pressing the magnet pieces 31 in three directions, i.e. the alignment direction, the thickness direction and the width direction (or at least in two directions, i.e. the alignment direction and the thickness direction) by using a pressing force created by springs, hydraulic pressure, air pressure, and the like.

Figure 6:
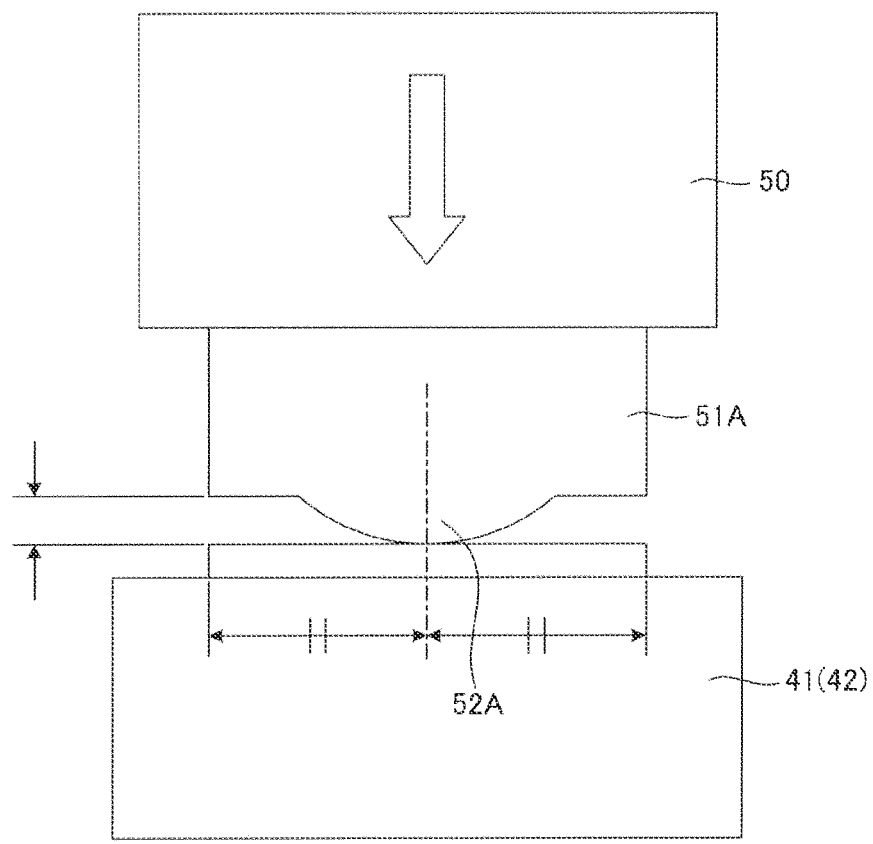
FIG. 6 illustrates a punch according to a second working example used in a magnet fracture apparatus.

A punch 51A according to a second working example shown in FIG. 6 has a projection 52A that projects in an arc-like fashion toward the central portion of the magnet 30 in the width direction. It should be noted that the height of the projection 52A is exaggerated in the illustration of FIG. 6. In practice, the height, of the projection 52A is set to be equal to or larger than the size tolerance set with respect to parallelism of the raw material of the magnet 30, warpage of the raw material, and flatness of the material (concavities and convexities on the front surface of the raw material). By thus setting the height of the arc-like projection 52A of the punch 51A, the projection 52A strongly comes into contact with the central position of the magnet 30 in the width direction, even in consideration of tolerances of parallelism of the raw material of the magnet 30, warpage of the raw material, and flatness of the material (concavities and convexities on the front surface of the raw material). Furthermore, the intensity of contact gradually decreases toward both sides in the width direction.

Therefore, in the present working example also, at the time of fracturing the magnet 30, the ark-like projection 52A provided in the punch 51A strongly comes into contact with the central portion of the magnet 30 in the width direction without causing partial hitting. Also, the intensity of contact gradually decreases toward both sides in the width direction. This allows cracks to be formed reliably from the central position of the magnet 30 in the width direction. The cracks formed in the central portion propagate toward both sides in the width direction of the magnet 30. When the cracks reach both side portions of the magnet 30, the magnet 30 can be fractured along the intended fracture surfaces. As a result, the occurrence of abnormal fracture, in which fracture surfaces do not match the intended fracture surfaces or become two-pronged, can be prevented, and the accuracy of fracture surfaces can be improved.

Figure 7:
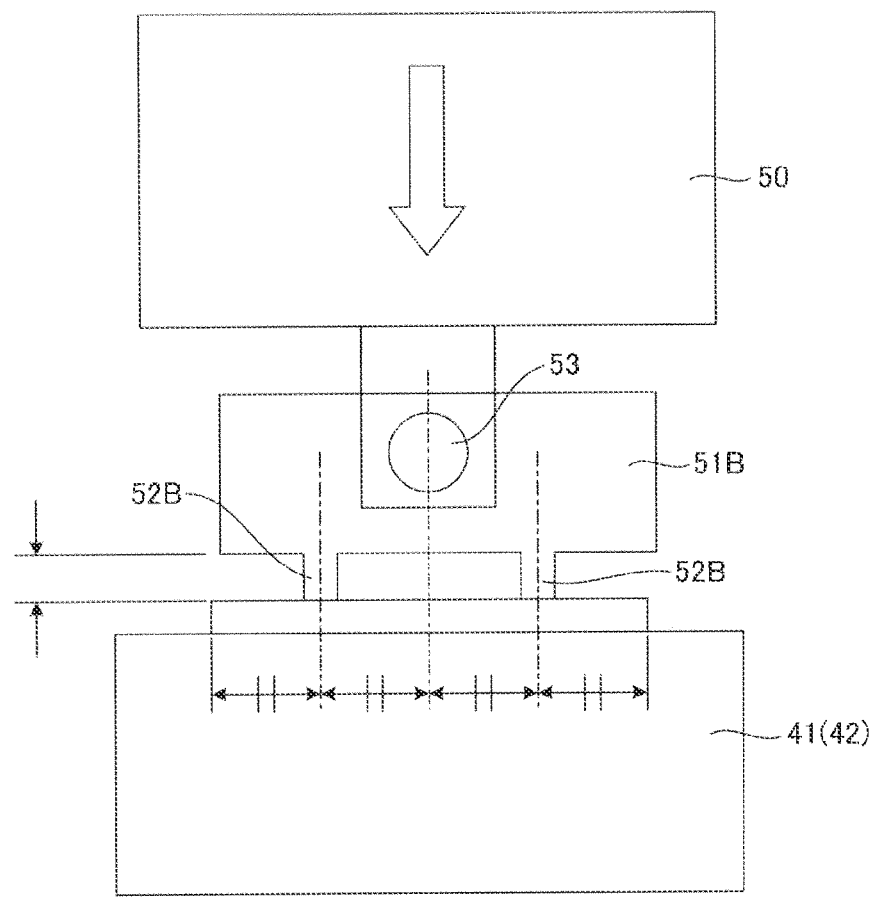
FIG. 7 illustrates a punch according to a third working example used in a magnet fracture apparatus.

A punch 51B according to a third working example shown in FIG. 7 has projections 52B projecting from two areas in the width direction of the magnet 30. The two projections 52B are provided at the central positions of sections obtained by bisecting the width of the magnet 30, that is to say, at the positions corresponding to ¼ and ¾ of the width of the magnet 30. Therefore, the two projections 52B are formed symmetrically with respect to the center of the magnet 30 in the width direction.

It should be noted that the height of the projections 52B is exaggerated in the illustration of FIG. 7. In practice, the height of the projections 52B is set to be equal to or larger than the size tolerance set with respect to parallelism of the raw material of the magnet 30, warpage of the raw material, and flatness of the material (concavities and convexities on the front surface of the raw material). Furthermore, this punch 51B is joined to the upper tool 50 at the midpoint between the two projections 52B via a support shaft 53, which is arranged to extend along the sideways direction perpendicular to the width direction of the magnet 30. Joining the punch SIB to the upper tool 50 via the support shaft 53 in the above manner makes the punch 51B swingable around the support shaft 53, and allows both of the two projections 52B to evenly come into contact with the front surface of the magnet 30 at the time of fracture.

In the present working example, at the time of fracturing the magnet 30, the support shaft 53 allows the two projections 52B provided in the punch 51B to swing in accordance with the condition of the front surface of the magnet 30. In this way, partial hitting can be prevented, and the two projections 52B can evenly and strongly come into contact with two areas of the magnet 30 corresponding to ¼ and ¾ of the width of the magnet 30. This allows cracks to be form reliably from the central positions of sections obtained by bisecting the width of the magnet 30. The formed cracks propagate toward both sides in the width direction of the magnet 30. Cracks propagating toward the center of the magnet 30 in the width direction merge at the central portion of the magnet 30 in the width direction. Cracks propagating toward both side portions of the magnet 30 in the width direction reach the corresponding side portions. Therefore, the timing at which the cracks merge at the central portion coincides with the timing at which the cracks reach the both side portions. At this timing, the magnet 30 can be fractured along the intended fracture surfaces. As a result, the occurrence of abnormal fracture, in which fracture surfaces do not match the intended fracture surfaces or become two-pronged, can be prevented, and the accuracy of fracture surfaces can be improved.

Figure 8:
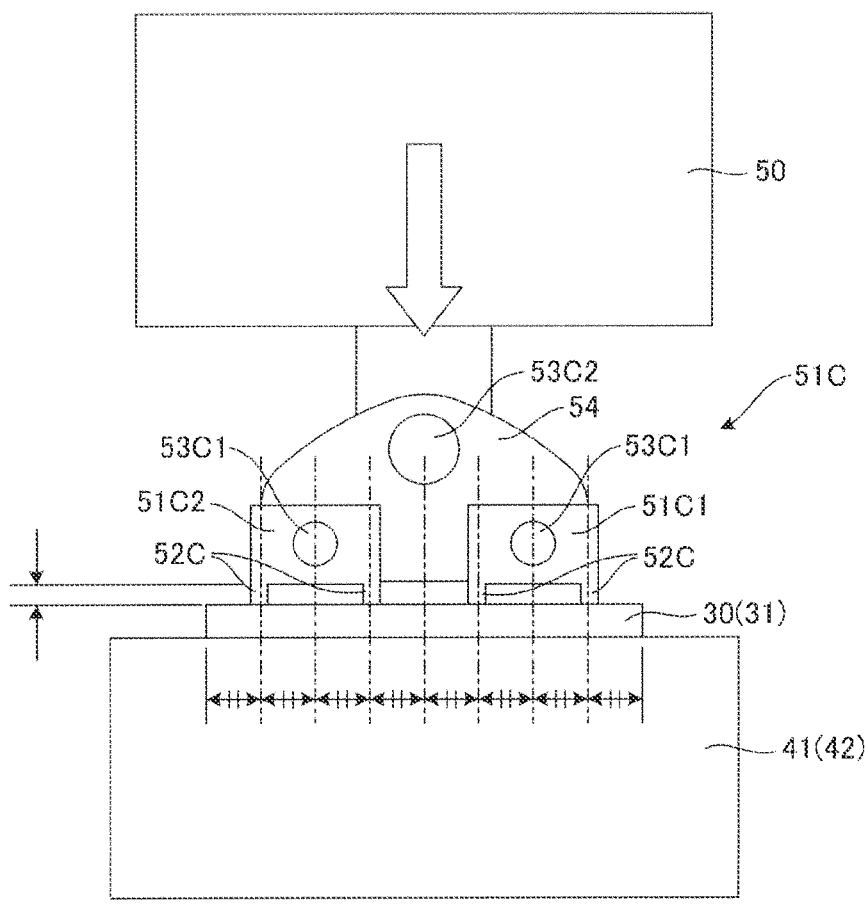
FIG. 8 illustrates a punch according to a fourth working example used in a magnet fracture apparatus.

A punch according to a fourth working example shown in FIG. 8 has projections 52C projecting from four areas in the width direction of the magnet 30. The four projections 52C are provided at the central positions of sections obtained by quadrisecting the width of the magnet 30. Therefore, the four projections 52C are formed symmetrically with respect to the center of the magnet 30 in the width direction.

It should be noted that the height of the projections 52C is exaggerated in the illustration of FIG. 8. In practice, the height of the projections 52C is set to be equal to or larger than the size tolerance set with respect to parallelism of the raw material of the magnet 30, war page of the raw material, and flatness of the material (concavities and convexities on the front surface of the raw material).

Thus punch 51C is made up of two punch pieces 51C1, 51C2, which are respectively located on one side and the other side in the width direction of the magnet 30. Each of the punch pieces 51C1, 51C2 has two projections 52C projecting toward the magnet 30 at both ends thereof. Each of the punch pieces 51C1, 51C2 is joined to a punch support member 54 at the midpoint between the two projections 52C thereof via a support shaft 53C1, which is arranged to extend along the sideways direction perpendicular to the width direction of the magnet 30. Furthermore, this punch support member 54 is joined to the upper tool 50 at the midpoint between the support shafts 53C1 supporting the punches 51C1, 51C2 via a support shaft 53C2, which is arranged to extend along the sideways direction perpendicular to the width direction of the magnet 30.

Joining the punches 51C1, 51C2 to the punch support member 54 via the support shafts 53C1 in the above manner makes the punches 51C1, 51C2 swingable around the support shafts 53C1. Furthermore, joining the punch support member 54 to the upper tool 50 via the support shaft 53C2 makes the punches 51C1, 51C2 swingable around the support shafts 53C1, 53C2. In this way, at the time of fracture, each of the two punches 51C1, 51C2 moves up and down in accordance with the shape of the front surface of one side of the magnet 30 in the width direction, thereby allowing both of the two projections 52C thereof to evenly come into contact with the surface of the magnet 30.

In the present working example, at the time of fracturing the magnet 30, the support shafts 53C1, 53C2 allow the two projections 52C provided in each of the two punches 51C1, 51C2 to swing in accordance with the condition of the front surface of the magnet 30. In this way, partial hitting can be prevented, and the projections 52C can evenly and strongly come into contact width the central positions of sections obtained by quadrisecting the width of the magnet 30. This allows cracks to be formed reliably from the central positions of sections obtained by quadrisecting the width of the magnet 30. The formed cracks propagate toward both sides in the width direction of the magnet 30. Cracks propagating in the width direction of the magnet 30 merge with other cracks that have been formed by adjacent projections 52C and are propagating in the width direction. Cracks propagating toward both side portions of the magnet 30 in the width direction reach the corresponding side portions.

The timing at which the cracks merge with one another coincides with the timing at which the cracks reach the both side portions. At this timing, the magnet 30 can be fractured along the intended fracture surfaces. As a result, the occurrence of abnormal fracture, in which fracture surfaces do not match the intended fracture surfaces or become two-pronged, can be prevented, and the accuracy of fracture surfaces can be improved.

Figure 9:
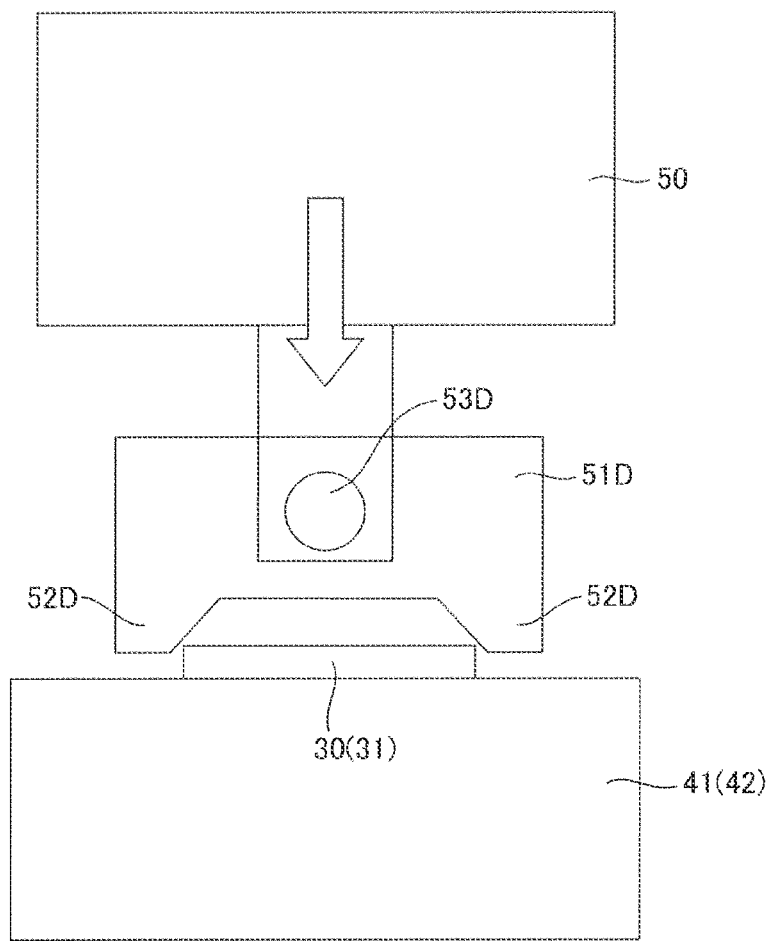
FIG. 9 illustrates a punch according to a fifth working example used in a magnet fracture apparatus.

A punch 51D according to a fifth embodiment shown in FIG. 9 is used in the case where the width of the magnet 30 is relatively small. The punch 51D has two projections 52D that come into contact with both side edges of the magnet 30 in the width direction. That is to say, the two projections 52D are formed symmetrically with respect to the center of the magnet 30 in the width direction. The two projections 52D, which come into contact with both side edges of the magnet 30 in the width direction, project from both ends of the punch 51D toward both sides of the magnet 30 in the width direction. The opposing inner edges of the two projections 52D are inclined to have a "flared" shape, such that the distance therebetween decreases toward the upward direction and increases toward the downward direction. Furthermore, this punch 51D is joined to the upper tool 50 at the midpoint between the two projections 52D via a support shaft 53D, which is arranged to extend along the sideways direction perpendicular to the width direction of the magnet 30. Joining the punch 51D to the upper tool 50 via the support shaft 53D in the above manner makes the punch 51D swingable around the support shaft 53D. Therefore, at the time of fracture, the punch 51D can evenly come into contact with both side edges of the magnet 30 in the width direction.

In the present working example, at the time of fracturing the magnet 30, the support shaft 53D allows the two projections 52D provided in the punch 51D to swing in accordance with both side edges of the magnet 30 in the width direction. In this way, partial hitting can be prevented, and the two projections 52D can evenly come into contact with both side edges of the magnet 30 in the width direction. This allows cracks to be formed reliably from both side edges of the magnet 30 in the width direction. The formed cracks propagate toward the center of the magnet 30 in the width direction. Cracks propagating toward the center of the magnet 30 in the width direction merge at the central portion. When they merge, the magnet 30 can be fractured along the intended fracture surfaces. As a result, the occurrence of abnormal fracture, in which fracture surfaces do not match the intended fracture surfaces or become two-pronged, can be prevented, and the accuracy of fracture surfaces can be improved. The present embodiment can achieve the following effects.

(A) A field-pole magnet manufacturing apparatus fractures the magnet 30 fixed on the dies 41, 42 serving as lower tools by causing the punch 51 of the upper tool 50 to press the magnet 30 while in contact with the magnet 30. At least one projection 52 is formed in the punch 51 of the upper tool symmetrically with respect to the central position of the magnet 30 in the width direction. In this way, at least one projection 52 of the punch 51 comes into contact with the magnet 30 symmetrically with respect to the central position of the magnet 30 in the width direction. Consequently, partial hitting of the punch 51 can be prevented. Therefore, the occurrence of abnormal fracture, in which fracture surfaces of the magnet pieces 31 do not match the intended fracture surfaces or become two-pronged, can be prevented even under the presence of poor parallelism of the raw material of the magnet 30, warpage of the raw material, poor flatness of the material (concavities and convexities on the front surface of the raw material), and the like. As a result, the accuracy of fracture surfaces of the magnet pieces 31 can be improved. In addition, as increased accuracy of parallelism between upper and lower tools is not required, manufacture and management of the tools are easy.

The punch 51B shown in FIG. 7 has two projections 52B that are symmetric with respect to the central position of the magnet 30 in the width direction, and is supported swingably with respect to the upper tool around the midpoint between the two projections 52B. Therefore, at the time of fracturing the magnet 30, the two projections 52B provided in the punch 51B prevents partial hitting by swinging in accordance with the condition of the front surface of the magnet 30, even under the presence of poor parallelism of the raw material of the magnet 30, warpage of the raw material, poor flatness of the material (concavities and convexities on the front surface of the raw material), and the like. As a result, the effect, described in the above (A) is improved.

(C) The two projections 52B shown in FIG. 7 are arranged at the central positions of sections obtained by bisecting the width of the magnet 30. This allows cracks to be formed reliably from the central portions of sections obtained by bisecting the width of the magnet 30. The formed cracks propagate toward both sides in the width direction of the magnet 30 and merge at the central portion of the magnet 30 in the width direction. Cracks propagating toward both side portions of the magnet 30 in the width direction reach the corresponding side portions. In this way, the timing at which the cracks merge at the center coincides with the timing at which the cracks reach the both side portions. Furthermore, the occurrence of abnormal fracture, in which fracture surfaces do not match the intended fracture surfaces or become two-pronged, can be prevented, and the accuracy of fracture surfaces can be improved.

(D) The punch 51C shown in FIG. 8 is made up of the punch support member 54 and the pair of punches 51C1, 51C2. The punch support member 54 is swingable with respect to the upper tool 50 around the central position in the width direction of the magnet 30. The pair of punches 51C1, 51C2 is swingable with respect to the punch support member 54 about the central positions of sections obtained by bisecting the width of the magnet 30. The projections 52C are arranged at the central positions of sections obtained by quadrisecting the width of the magnet 30. Each of the pair of punches 51C1, 51C2 is provided with two projections 52C. That is to say, the projections 52C are provided symmetrically with respect to the central position of the magnet 30 in the width direction. Therefore, at the time of fracturing the magnet 30, the support shafts 53C1, 53C2 allow the two projections 52C provided in each of the two punches 51C1, 51C2 to swing in accordance with the condition of the front surface of the magnet 30. In this way, partial hitting can be prevented, and the projections 52C can evenly and strongly come into contact with the central positions of sections obtained by quadrisecting the width of the magnet 30. Cracks can be formed reliably from the central positions of sections obtained by quadrisecting the width of the magnet 30. The formed cracks propagate toward both sides in the width direction of the magnet 30. Cracks propagating in the width direction of the magnet 30 merge with other cracks that have been formed by adjacent projections 52C and are propagating in the width direction. Cracks propagating toward both side portions of the magnet 30 in the width direction reach the corresponding side portions. The timing at which the cracks merge with one another coincides with the timing at which the cracks reach the both side portions. At this timing, the magnet 30 can be fractured along the intended fracture surfaces. As a result, the occurrence of abnormal fracture, in which fracture surfaces do not match the intended fracture surfaces or become two-pronged, can be prevented, and the accuracy of fracture surfaces can be improved.

(E) The height of the projections 52 is equal to or larger than the tolerance set with respect to parallelism of the raw material of the magnet 30, warpage of the raw material, and flatness of the front surface of the material determined by concavities and convexities. Therefore, the projections 52 can reliably come into contact with the front surface of the magnet 30 even under the presence of poor parallelism of the raw material of the magnet 30, warpage of the raw material, poor flatness of the material (concavities and convexities on the front surface of the raw material), and the like.

This application claims priority based on JP2011-209235, filed with the Japan Patent Office on Sep. 26, 2011, the entire contents of which are incorporated into this specification by reference.

The invention claimed is:

1. A field-pole magnet manufacturing apparatus for fracturing a magnet, the magnet being provided with a cutout groove on one surface thereof, the field-pole magnet manufacturing apparatus comprising:
   a pair of dies defining a lower tool on which the magnet is fixed when fracturing the magnet, the pair of dies being spaced from each other;
   a punch of an upper tool configured to move toward the magnet fixed on the pair of dies in contact with the magnet;
   a projection provided on a bottom surface of the punch facing the magnet, the projection being provided only at a position facing a central position of the magnet in a width direction of the magnet, the width direction of the magnet being perpendicular to a direction from one die of the pair of dies to the other die of the pair of dies and equal to a direction of the cutout groove,
   wherein the projection is structured in relation with a movement of the punch to press a surface of the magnet opposite to the one surface of the magnet in a state in which the magnet is fixed on the pair of dies such that the one surface of the magnet faces the pair of dies defining the lower tool, and the cutout groove is located between the pair of dies, and
   wherein only the projection comes into contact with the magnet, without any portion of the punch other than the projection coming into contact with the magnet.

2. The field-pole magnet manufacturing apparatus according to claim 1, wherein
   the projection comprises two projections that are symmetric with respect to the central position of the magnet in the width direction, and the punch is supported swingably with respect to the upper tool around a midpoint between the two projections.

3. The field-pole magnet manufacturing apparatus according to claim 2, wherein
   the two projections are arranged at central positions of sections obtained by bisecting a width of the magnet.

4. The field-pole magnet manufacturing apparatus according to claim 1, wherein
   the punch has a punch support member and a pair of punches, the punch support member being swingable with respect to the upper tool around a central position in the width direction of the magnet, and the pair of punches being swingable with respect to the punch support member around central positions of sections obtained by bisecting a width of the magnet, and
   the projection comprises two projections provided in each of the pair of punches, each of the two projections being arranged at central positions of sections obtained by quadrisecting the width of the magnet.

5. A field-pole magnet manufacturing method for fracturing a magnet fixed on a pair of dies serving as a lower tool by causing a punch of an upper tool to press the magnet while the punch is in contact with the magnet, the magnet being provided with a cutout groove on one surface thereof, the method comprising:
   arranging the pair of dies so as to be spaced from each other;
   providing a punch of an upper tool having a bottom surface facing the magnet and comprising a projection provided only at a position facing a central position of the magnet in a width direction of the magnet, the width direction of the magnet being perpendicular to a direction from one die of the pair of dies to the other die of the pair of dies and equal to a direction of the cutout groove;
   fixing the magnet on the pair of dies such that the one surface thereof faces the pair of dies and the cutout groove is located between the pair of dies;
   causing the projection of the punch to come into contact with an upper surface of the magnet while causing any portion of the punch other than the projection to be out of contact with the upper surface of the magnet, the upper surface of the magnet being opposite from the one surface of the magnet;
   driving the punch to press the projection against the magnet so as to form a crack at a site of the magnet that is in contact with the projection; and fracturing the magnet by propagation of the formed crack in the width direction.

6. The field-pole magnet manufacturing method according to claim 5, wherein
   the punch, which is provided with the projection that is symmetric with respect to the central position of the magnet in the width direction and which comprises a plurality of projections, is supported swingably with respect to the upper tool around a midpoint between projections located at both ends.

7. A field-pole magnet manufacturing apparatus for fracturing a magnet, the magnet being provided with a cutout groove on one surface thereof, the field-pole magnet manufacturing apparatus comprising:
   a pair of dies on which the magnet is fixed, the pair of dies being spaced from each other;
   a punch configured to move toward the magnet fixed on the pair of dies; and
   a projection provided on a bottom surface of the punch facing the magnet,
   wherein the projection is provided only at a position facing a central position of the magnet in a width direction of the magnet, wherein the width direction is horizontally perpendicular to a direction from one die of the pair of dies to the other die of the pair of dies and equal to a direction of the cutout groove, and
   wherein the projection is structured to, in relation with movement of the punch, press a surface of the magnet opposite to the one surface of the magnet in a state where the magnet is fixed on the pair of dies such that the cutout groove faces a space between the pair of dies, and
   wherein only the projection comes into contact with the magnet, without any portion of the punch other than the projection coming into contact with the magnet.

8. A field-pole magnet manufacturing method for fracturing a magnet, the magnet being provided with a cutout groove on one surface thereof, the method comprising:
   arranging a pair of dies so as to be spaced from each other;
   fixing the magnet on the pair of dies such that the one surface thereof faces the pair of dies and the cutout groove is located between the pair of dies;
   moving a punch toward the magnet, the punch having a bottom surface facing the magnet on which a projection is provided;
   driving the punch to press the projection against the magnet so as to form a crack at a site of the magnet that is in contact with the projection; and
   fracturing the magnet by propagation of the formed crack in a width direction, wherein the width direction of the magnet is horizontally perpendicular to a direction from one die of the pair of dies to the other die of the pair of dies and equal to a direction of the cutout groove, wherein the projection is provided only at a position facing a central position of the magnet in the width direction of the magnet, and wherein only the projection comes into contact with the magnet, without any portion of the punch other than the projection coming into contact with the magnet.

\* \* \* \* \*